(12) United States Patent
Kim

(10) Patent No.: US 7,159,153 B2
(45) Date of Patent: Jan. 2, 2007

(54) SEMICONDUCTOR INTEGRATED CIRCUIT WITH SECURITY FUNCTION

(75) Inventor: Jong-Cheol Kim, Suwon-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 560 days.

(21) Appl. No.: 10/357,146

(22) Filed: Feb. 3, 2003

(65) Prior Publication Data
US 2003/0149914 A1    Aug. 7, 2003

(30) Foreign Application Priority Data
Feb. 5, 2002 (KR) ............... 10-2002-0006435

(51) Int. Cl.
*G06F 11/00* (2006.01)
(52) U.S. Cl. .......................... 714/48; 714/49
(58) Field of Classification Search .................. 714/47, 714/48, 49
See application file for complete search history.

(56) References Cited

U.S. PATENT DOCUMENTS

| | | | |
|---|---|---|---|
| 5,793,674 A * | 8/1998 | Kubo et al. | 365/185.09 |
| 5,812,751 A * | 9/1998 | Ekrot et al. | 714/4 |
| 6,212,134 B1 | 4/2001 | Yamashita | |
| 6,553,496 B1 * | 4/2003 | Buer | 726/34 |
| 6,615,374 B1 * | 9/2003 | Moran | 714/48 |
| 6,829,737 B1 * | 12/2004 | McBride | 714/718 |

FOREIGN PATENT DOCUMENTS

| | | |
|---|---|---|
| CN | 1258042 A | 6/2000 |
| KR | 1998-83379 | 12/1998 |
| KR | 2000-57711 | 9/2000 |

OTHER PUBLICATIONS

Pierre Paradinas and Jean-Jacques Vandwalle. "New Directions for Integrated Circuit Cards Systems". 1994. ACM Press. ACM SIGOPS European Workshop: Proceedings of the Sixth Workshop: Matching Operating Systems to Application Needs. pp. 5-10.*
First Office Action of The Patent Office of the People's Republic of China with English translation thereof Dated: Mar. 10, 2006.

* cited by examiner

*Primary Examiner*—Scott Baderman
*Assistant Examiner*—Joshua Lohn
(74) *Attorney, Agent, or Firm*—F. Chau & Assoc., LLC

(57) ABSTRACT

An IC (integrated circuit) card (or smart card) comprising a plurality of detectors for detecting abnormal operating conditions of the IC card. If an abnormal condition is detected by one of the detectors, the detector will generate a detection signal, which is then stored in a nonvolatile memory. A reset signal is then generated in response to the detection signal to reset a central processor unit. The central processor unit informs a user of a reset status and a cause thereof.

16 Claims, 3 Drawing Sheets

SEMICONDUCTOR INTEGRATED CIRCUIT WITH SECURITY FUNCTION

CROSS-REFERENCE TO RELATED APPLICATION

This application claims priority to Korean Patent Application No. 2002-6435, filed on Feb. 5, 2002, the contents of which are incorporated by reference herein.

FIELD OF THE INVENTION

The present invention generally relates to integrated circuits with security functions. More particularly, the invention relates to an IC (integrated circuit) card having a security controller that detects abnormal conditions such as unauthorized access, destruction, or alteration of information by unauthorized users and abnormal operating environments.

BACKGROUND

Since the advent of credit cards in the 1920s, various types of personal cards (e.g., cash cards, identification cards, shopping cards, credit cards, etc.) have been widely used for performing various transactions. Recently, IC cards have become very popular due to the many advantages offered by IC cards including, for example, convenience, security, and various types of utility functions that are enabled by use of IC cards.

Typically, an IC card is fabricated with a thin semiconductor device attached on a credit card-sized plastic sheet with thickness of about 0.5 mm in the form of chip-on-board (COB). An IC card is highly adaptable for use with advanced information multimedia applications because IC cards provide better security and protection from data loss, as compared to cards having magnetic tapes.

In general, for IC cards having similar patterns and sizes of typical magnetic strip cards, there are two types of IC cards, i.e., contactless IC cards (CICC) and remote coupling communication cards (RCCC). A CICC (as developed by AT&T) is capable of sensing in the range of ½ inch, and the RCCC can be sensible in the range of 700 cm, which is standardized as ISO DIS 10536.

There is another way of classifying IC cards based on, e.g., whether the IC card comprises an embedded microprocessor. An IC card having an embedded microprocessor is generally referred to as a "smart card", which is distinguished from contactless IC cards and memory cards which do not include microprocessors. A smart card typically comprises a central processor unit, an electrically erasable and programmable read-only-memory (EEPROM) for storing application program files, a ROM, and a RAM.

Smart cards can be used in various applications, providing high reliability/security, large capacity for data storage, and various functions (e.g., electronic purse). Indeed, smart cards can be utilized in various fields to facilitate managing information with bi-directional communication, distributed processing, and secured information preservation. Such fields include, e.g., finance, distribution, factory and office automation, medical treatment, traffic, industries, social security, mobile communication, pay phones, cable televisions, maintenance for power, gas, and water supply, education, credit cards, debit cards, pre-paid cards, city gas maintenance, information security, and home banking. Correspondingly, given the current trend of integrating various functions associated with a service in a single card, smart cards conveniently provide the apparatus and communication methods that are needed for supporting various services.

It is preferable for smart cards to provide reliable security that is capable of maintaining information stored therein so as to prevent the outflow of information for users or system managers. Some methods for monitoring internal signals of smart cards to find data features may cause damage to the data, for example, using an oscilloscope for scanning metal lines on a chip surface after removing a silicon oxide layer covering the chip surface (called "de-capsulation"). To eliminate such monitoring, a detection device is needed for detecting a de-capsulation event, such as a light exposure detector coupled to an optical receiver, or a passivation removal detector. Another way of monitoring a smart card is to monitor data that is being communicated through transmission lines using a frequency detector to determine if a main clock signal frequency is out of a predetermined range.

A smart card should be adapted to protect against physical damage due to, e.g., operation environments and unauthorized de-capsulations. A voltage detector can be employed to protect a smart card by managing a range of a standard voltage and protect against over-ranging of the standard voltage, which may cause destructive electrical stress on the smart card. Further, a temperature sensor is useful to detect abnormal temperatures to prevent against damage to the smart card due to abnormal low or high temperatures.

As described above, a conventional smart card can be protected from damage, e.g., information leakage by external intrusions, physical destruction, data modulation, or abnormal environments of operation, by resetting internal circuits of the smart card as well as a microprocessor, when there is at least a valid detection signal generated from a detection device (i.e., optical detector, passivation removal detector, frequency detector, voltage detector, temperature sensor, etc.). Conventional smart cards, however, do not include functions that enable a user to acknowledge unauthorized intrusions or reset reasons while a smart card is being conductive with re-encapsulation after its recovery of main clock frequency, voltage, environmental temperature, and so on. In fact, even if private information about a personal affair or a financial account has been stolen or modified by a malicious intruder, an authorized user or a permitted system manager could not determine or verify an illegal trespass.

SUMMARY OF THE INVENTION

The present invention is directed to a semiconductor IC (integrated circuit) card comprising a security circuit that is capable of storing information associated with the detection of abnormal conditions due to unauthorized intrusions and abnormal operating environments. The security circuit is preferably embedded in the IC card and provides information to a user that enables the user to determine a reset status of a central processing unit of the IC card and the cause thereof.

In one aspect of the invention, a semiconductor integrated circuit having a central processor unit, comprises a plurality of detectors, wherein each detector detects a corresponding operating condition of the integrated circuit and generates a detection signal that indicates an abnormal condition, a reset signal generator for generating a reset signal in response to a detection signal output from one of the detectors, and a nonvolatile memory for storing detection signals output from the detectors. The central processor unit is reset in response to the reset signal after the detection signals have been stored in the nonvolatile memory.

In another aspect, the integrated circuit includes latches for storing the detection signals, a logic circuit for generating a program signal when at least one of the detection signals indicates an abnormal condition, and a timer for generating a timer control signal when a predetermined time has elapsed after the program signal is activated. The nonvolatile memory stores the detection signals in response to the program signal. The reset signal generator generates the reset signal in response to the timer control signal. The predetermined time is preferably the time needed for storing the detection signals into the nonvolatile memory in response to the program signal.

In yet another aspect of the invention, the nonvolatile memory includes a plurality of memory cells for storing the detection signals. The memory cells are preferably electrically erasable and programmable read-only memory cells.

In another aspect of the invention, the integrated circuit may comprise a smart card having an embedded central processor unit therein.

In yet another aspect, the detectors comprise detectors for sensing operational environments such as a frequency of a system clock, a power supply voltage, temperature, and light exposure.

These and other aspects, features, and advantages of the present invention will become apparent from the following detailed description of the preferred embodiments, which is to be read in connection with the accompanying drawings.

DETAILED DESCRIPTION PREFERRED EMBODIMENTS OF THE INVENTION

The present invention will now be described in detail with reference to the accompanying drawings, in which preferred embodiments of the invention are shown. Throughout the drawings, the same reference number denotes the same or similar elements. It is to be understood that the various embodiments described herein may be embodied in many different forms and the description herein should not be construed as placing any limitation on the scope of the invention.

Figure 1:
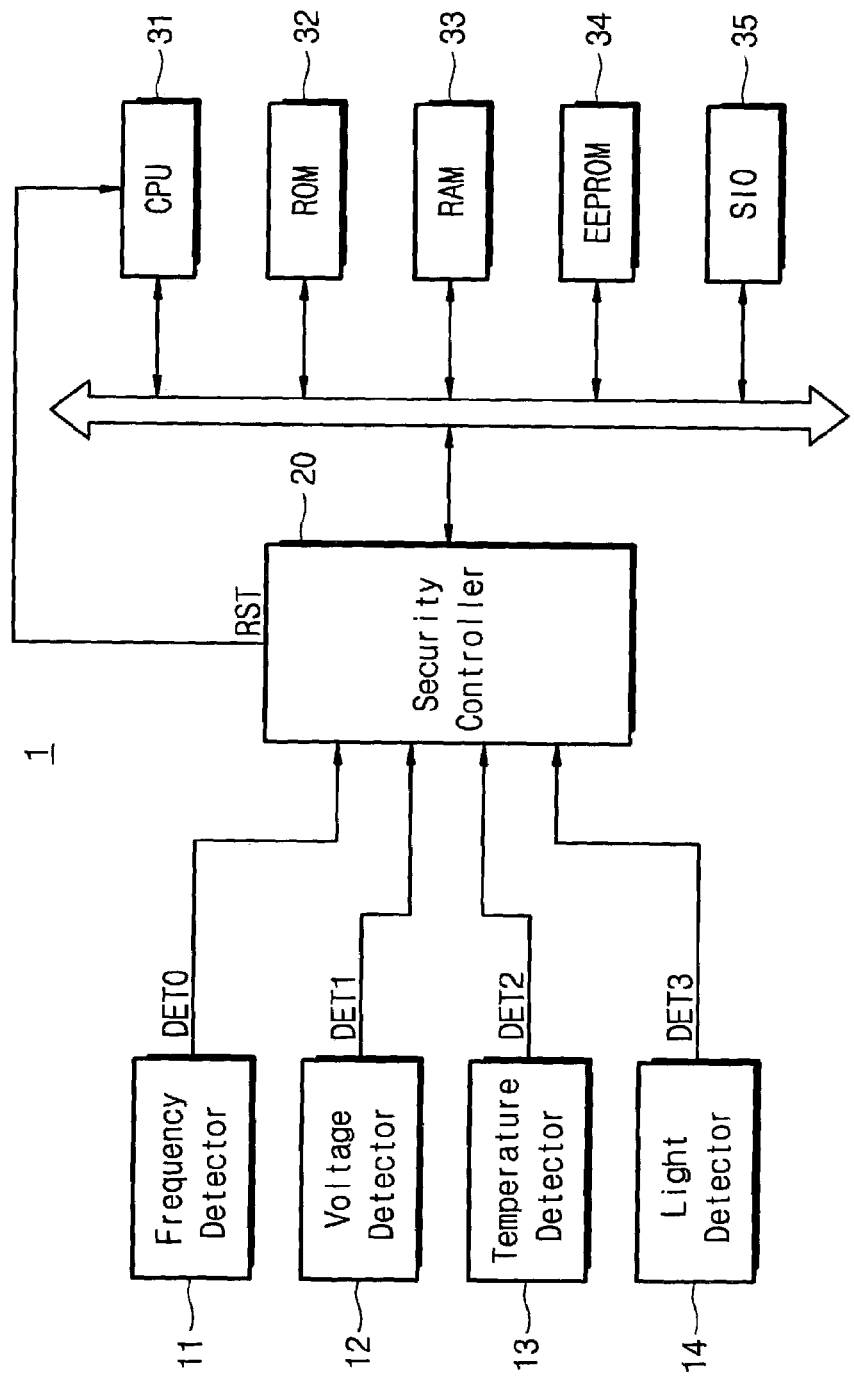
FIG. 1 is a block diagram of a smart card comprising an embedded security controller, according to an embodiment of the invention.

Referring to FIG. 1, a smart card according to an embodiment of the invention comprises a central processor unit (CPU) 31, a read-only memory (ROM) 32, a random-access memory (RAM) 33, an electrically erasable-and-programmable read-only memory (EEPROM) 34, a serial input/output interface (SIO) unit 35, a frequency detector 11, a voltage detector 12, a temperature detector 13, a light detector 14, and a security controller 20. The security controller 20 generates a reset signal RST in response to at least one of a plurality of detection signals DET0~DET3 generated by detectors/sensors 11~14.

The frequency detector 11 detects a frequency of a main clock signal and then generates the detection signal DET0 when a current frequency of the main clock signal is out of a regulated frequency range. The voltage detector 12 determines the voltage level of an external voltage supplied from, e.g., a card leader, and then generates a detection signal DET1 if the detected voltage level exceeds a regulated range. The temperature detector 13 senses surrounding temperature of the smart card 1 and then generates a detection signal DET2 when the detected temperature is out of a predetermined range. The light detector 14 generates a detection signal DET3 when a chip surface is exposed to light due to elimination of a silicon oxide film which has been used as a passivation layer for the chip surface. In addition to the detecting units 11–14, various types of detectors/sensors may be included within the smart card 1 to determine abnormal states associated with unauthorized intrusions or abnormal operating conditions, for example. The security controller 20 generates a reset signal RST to reset CPU 31 after storing one of the detection signals from the detectors 11–14.

Figure 2:
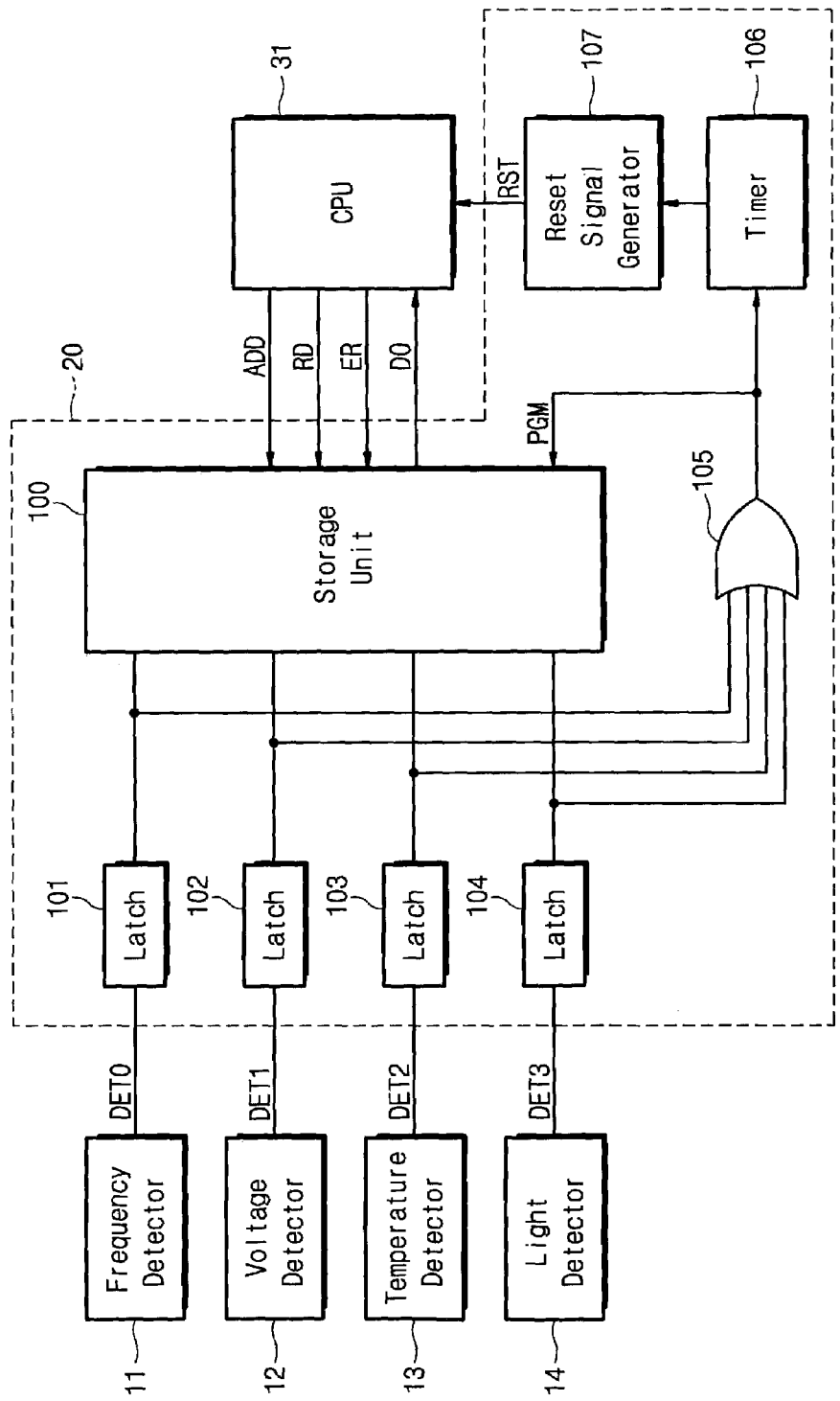
FIG. 2 is a schematic diagram of a smart card illustrating details of a security controller according to an embodiment of the invention.

With reference to FIG. 2, in a preferred embodiment, the security controller 20 comprises a storage unit 100, latch units 101~104, a signal sensor 105, a timer 106, and a reset signal generator 107. The latch circuits 101~104 are arranged corresponding to the detectors 11~14 and store the respective detection signals. The signal sensor 105, e.g., an OR gate, determines whether there is at least one detection signal stored in the latch circuits and then generates a program signal PGM. The storage unit 100 stores the detection signals DET0~DET3 which have been held in the latch circuits 101~104, in response to the program signal PGM. The timer 106 generates a control signal after a predetermined time has elapsed from the time the program signal PGM was supplied from the OR gate 105. The reset signal generator 107 outputs a reset signal RST in response to the control signal supplied from the timer 106. The reset signal RST initializes the CPU 31. The CPU 31 may restart with a normal power supply voltage and a clock signal of a regular frequency in a normal condition after being reset. At re-initialization of the CPU 31, data is read out from the storage unit 100 in accordance with a read signal RD and an address ADD. The data read out from the storage unit 100, indicating that there was an unauthorized intrusion or occurrence of an abnormal condition, may be referenced by a user in conditioning the system.

Figure 3:
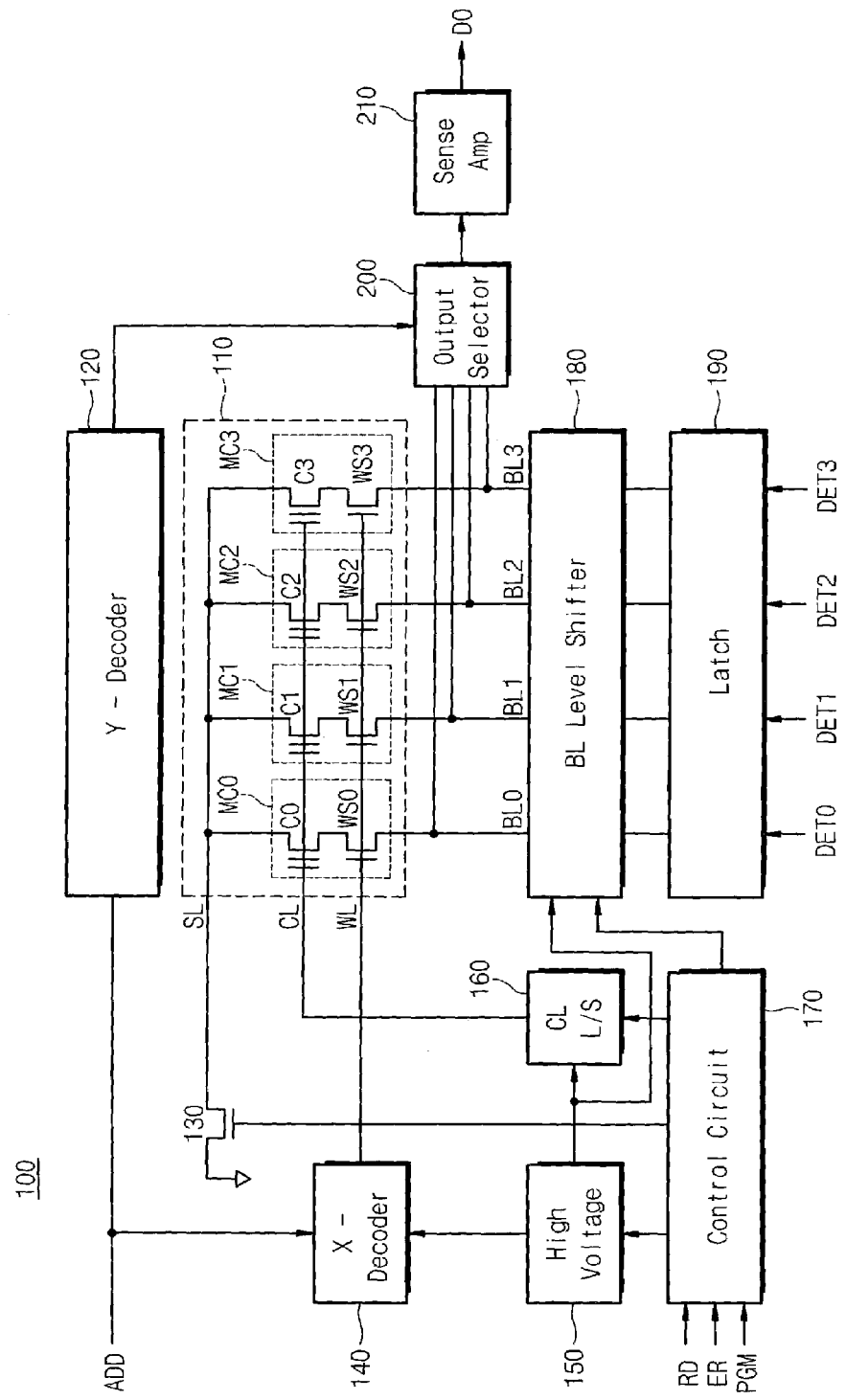
FIG. 3 is a schematic diagram illustrating a storage unit according to an embodiment of the invention, which is preferably implemented in the security controller shown in FIG. 2.

Referring to FIG. 3, the storage unit 100 comprises a memory cell array 110 having a plurality of memory cells, e.g., MC0~MC3, arranged along one row and a plurality of columns. The unique row is composed of a control line CL and a wordline WL, and the columns are configured to bitlines BL0~BL3. Each memory cell includes a cell transistor (e.g., C0~C3) electrically programmable and erasable, and a row selection transistor (e.g., WS0~WS3). The cell transistors C0~C3 substantially store the detection signals. The cell transistors may be constructed with other types of nonvolatile memory cells, such as EEPROM cells or flash cells, which are capable of retaining their own data even when a power supply is shut down. Source terminals of the cell transistors are commonly connected to a source line SL, and control gate terminals of the cell transistors are commonly coupled to a control line CL. The source terminals of the row selection transistors WS0~WS3 are each connected to drain terminals of the cell transistors C0~C3. The drain terminals of the row selection transistors WS0~WS3 are each connected to the bitlines BL0~BL3 and gates of the row selection transistors are commonly coupled to the wordline WL. A source line control transistor 130 connects the source line SL to ground voltage in response to a control circuit 170 during a read operation.

The control circuit 170 operates the circuit components in response to the read signal RD, the erase signal ER, and the program signal PGM. A high voltage generator 150 generates high voltages that are used in programming and erasing the memory cells MC0~MC3 and for reading data stored in the memory cells, as discussed below. An X-decoder 140 drives the wordline WL with the high voltage in accordance with an address signal ADD. It is to be understood that in the exemplary embodiment described herein the X-decoder 140 is associated with a unique row and thereby the X-decoder 140 just drives the unique wordline WL. In other embodiments where the memory cell array comprises memory cells that are arranged in a matrix of rows and columns, the X-decoder would select alternative ones of a plurality of rows in response to an address.

A level shifter 160 drives up the control line CL with either a high voltage VPP, ground voltage GND, or a predetermined positive voltage, in response to a control signal from the control circuit 170. A latch circuit 190 stores the detection signals DET0~DET3 provided from the latches 101~104. A bitline level shifter 180 drives up bitlines BL0~BL3 with either a high voltage VPP, ground voltage GND, or a predetermined positive voltage, in accordance with detection signals DET0~DET3 and a control signal from the control circuit 170.

A Y-decoder 120 generates a selection signal to designate one of the bitlines BL0~BL3 in response to an external address ADD. An output selector 200 transfers one of voltages appearing at the bitlines BL0~BL3 to a sense amplifier 210 in response to the selection signal provided from the Y-decoder 120. The sense amplifier 210 converts a voltage level, which is obtained by the output selector 200, into a data output signal DO.

Details of operational modes of the storage unit 100 and smart card will now be discussed in further detail with reference to FIGS. 2 and 3. In a preferred embodiment, when error conditions are detected by detectors 11~14, the detectors will generate detection signals DET0~DET3 having a logic "high" level, whereas the detection signals will remain at a logic "low" levels when no errors are detected (during a normal state). For instance, if a silicon oxide layer covering a chip surface is de-capsulated, the light detector 14 will generate a detection signal DET3 having a "high" logic level. Accordingly, the latch 104 will store the high-leveled detection signal DET3, while the other latches will store low-leveled detection signals DET0~DET2. The OR gate 105 generates a program signal PGM having a high logic level in response to the high-leveled detection signal DET3, and then the cell transistors C0~C3 are programmed in an appropriate bias condition with the wordline WL, the bitline BL, the control line CL, and the source line SL. Table 1 below summarizes bias conditions for programming, erasing, and reading the cell transistors (or the memory cell) according to an embodiment of the invention.

TABLE 1

|  | Program | Erase | Read |
| --- | --- | --- | --- |
| Wordline (WL) | VPP (~17 V) | VPP | VCC (~5 V) |
| Bitline (BL) | VPP | GND | DC = 2 V |
| Control line (CL) | GND | VPP | DC = 2 V |
| Source line (SL) | Floating | Floating | Floating |

During a "program" operation, the X-decoder 140 bootstraps the wordline WL up to the high voltage VPP supplied from the high voltage generator 150. The control circuit 170 turns the source line control transistor 130 off, floating the source line SL. The level shifter 160 sets the control line CL to ground voltage GND. The latch circuit 190 receives the detection signals DET0~DET3 being held in the latches 101~104. The bitline level shifter 180 drives up the bitline (i.e., BL3) corresponding to the high leveled detection signal (i.e., DET3) with the high voltage VPP and sets the others (i.e., BL0~BL2) to ground voltage GND. Thus, the cell transistor C3 connected to the bitline BL3 is programmed to logic "0", while the other cell transistors C0~C2 maintain data of logic "1" (it is assumed that all the cell transistors have been erased before programming).

Meantime, referring to FIG. 1, the timer 106 receives the program signal PGM of a "high" logic level and generates a control signal after a predetermined time has elapsed. Preferably, the predetermined time in the timer 106 provides a sufficient delay (e.g., about 2 ms) that allows completion of a programming operation of the cell transistors C0~C3 (i.e., storing the detection signals). In response to the control signal from the timer 106, the reset signal generator 107 outputs the reset signal RST to reset the CPU 31.

By returning to a normal operating condition after the reset of the CPU 31, the CPU 31 restarts its inherent operation in accordance with supplies of regular power and system clock. At the time of the restarting, the CPU 31 applies the read signal RD and the address ADD to the storage unit 100 to read out a detection data signal from the storage unit 100. The address ADD may be a signal to designate the cell transistors C0~C3 (or the memory cells MC0~MC3) in series or in parallel.

Referring to FIG. 3, during a "read" operation, the wordline WL is driven by the X-decoder 140 with a voltage that is slightly higher than the power supply voltage, e.g., about 5V. The control line CL and the bitlines BL0~BL3 are driven with the predetermined positive voltages of about 2V by the level shifters 160 and 180, respectively. The control circuit 170 turns on transistor 130 to connect the source line SL to the ground voltage GND. Therefore, the detection data signals stored in the cell transistors C0~C3 are transferred to the output selector 200 through their corresponding bitlines BL0~BL3. The output selector 200 transfers one voltage level of the bitlines to the sense amplifier 210, in response to a selection signal that indicates one of the bitlines. The data signal DO output from the sense amplifier 210 is provided to the CPU 31. The CPU 31 determines if the data output signal DO received from the sense amplifier 210 indicates an abnormal condition (e.g., the de-capsulation of the oxide layer) and then informs a user of the occurrence of the abnormal condition. More specifically, in the exemplary embodiment described herein, assuming the cell transistors C0~C2 all store logic "1" while the cell transistor C3 stores logic "0", the CPU 31 informs the user there has been occurrence of an abnormal condition sensed by the light detector 14.

After completing the first informing step for a user, the cell transistors C0~C3 in the storage unit 100 are all erased in order to prepare the next detection process. During an "erasing" operation of the cell transistors (or the memory cells), the X-decoder 140 and the level shifter 160 drive up the wordline WL and the control line CL with the high voltage of about 17V. The bitline level shifter 180 sets the bitlines BL0~BL3 to ground voltage GND. The control circuit 170 turns transistor 130 off to provide a floating source line SL. Thus, the cell transistors C0~C3 are all erased simultaneously.

As stated above, in an exemplary embodiment of the present invention, abnormal conditions or errors in a smart card (such as unauthorized intrusions and irregular environments with frequency, temperature, or voltage, which may cause internal circuit damage of the smart card) are detected and information regarding such errors is stored in nonvolatile memory cells. Since the CPU is reset after storing such information about the abnormal conditions in the nonvolatile memory cells, a user can acknowledge the situations and take appropriate action.

Although illustrative embodiments have been described herein with reference to the accompanying drawings, it is to be understood that the present invention is not limited to those precise embodiments, and that various other changes and modifications may be affected therein by one skilled in the art without departing from the scope and spirit of the invention. All such changes and modifications are intended to be included within the scope of the invention as defined by the appended claims.

What is claimed is:

1. A semiconductor integrated circuit, comprising:
    a plurality of detectors, wherein each detector detects a corresponding operating condition of the integrated circuit and generates a detection signal that indicates an abnormal condition;
    a reset signal generator for generating a reset signal;
    a nonvolatile memory;
    a plurality of latch circuits for respectively latching the detection signals from the plurality of detectors, output signals from said plurality of latch circuits being fed to the nonvolatile memory;
    a logic circuit connected to said output signals from said plurality of latch circuits and producing a program signal upon a latch output signal indicating an abnormal condition, said program signal fed to said nonvolatile memory to cause said latch circuit outputs to be stored therein and said program signal being fed to said reset signal generator for generating a reset signal in response thereto; and
    a central processor unit (CPU) which is restarted in response to the reset signal after the detection signals have been stored in the nonvolatile memory in response to the program signal from the logic circuit, wherein upon restarting the CPU, a read signal is generated by the CPU to automatically read out stored detection signals from the nonvolatile memory to be referred to by a user to indicate there was an abnormal condition detected.

2. The integrated circuit of claim 1, further comprising a timer that generates a timer control signal fed to the reset signal generator when a predetermined time has elapsed after the program signal is produced by the logic circuit.

3. The integrated circuit of claim 2, wherein the reset signal generator generates the reset signal in response to the timer control signal.

4. The integrated circuit of claim 2, wherein the predetermined time is substantially equal to a time needed for writing the detection signals into the nonvolatile memory in response to the program signal.

5. The integrated circuit of claim 1, wherein the nonvolatile memory comprises a plurality of memory cells for storing the detection signals.

6. The integrated circuit of claim 5, wherein the memory cells comprise electrically erasable and programmable read-only memory cells.

7. The integrated circuit of claim 1, wherein the detectors comprise a frequency detector for sensing a frequency of a system clock, a voltage detector for sensing a power supply voltage, a temperature detector for sensing temperature, or light detector for sensing light exposure, or any combination thereof.

8. An IC (integrated circuit) card, comprising:
    an embedded CPU (central processing unit);
    a plurality of detectors, wherein each detector detects a corresponding operating condition of the IC card and generates a detection signal that indicates an abnormal condition;
    a reset signal generator for generating a reset signal;
    a nonvolatile memory;
    a plurality of latch circuits for respectively latching the detection signals from the plurality of detectors, output signals from said plurality of latches being fed to the nonvolatile memory; and
    a logic circuit connected to said output signals from said plurality of latch circuits and producing a program signal upon a latch output signal indicating an abnormal condition, said program signal fed to said nonvolatile memory to cause said latch circuit outputs to be stored therein and said program signal being fed to said reset signal generator for generating a reset signal in response thereto,
    wherein the embedded CPU is restarted in response to the reset signal after the detection signals have been stored in the nonvolatile memory in response to the program signal from the logic circuit, and wherein upon resetting of the CPU, a read signal is generated by the CPU to automatically read out a stored detection signal from the nonvolatile memory to be referred to by a user to indicate there was an abnormal condition detected.

9. The IC card of claim 8, further comprising a timer that generates a timer control signal fed to the reset generator when a predetermined time has elapsed after the program signal is produced by the logic circuit.

10. The IC card of claim 9, wherein the predetermined time is substantially equal to a time needed for writing the detection signals into the nonvolatile memory in response to the program signal.

11. The IC card of claim 8, wherein the nonvolatile memory comprises a plurality of memory cells for storing the detection signals.

12. The IC card of claim 11, wherein the memory cells comprise electrically erasable and programmable read-only memory cells.

13. The IC card of claim 8, wherein the detectors comprise a frequency detector for sensing a frequency of a system clock, a voltage detector for sensing a power supply voltage, a temperature detector for sensing temperature, or a light detector for sensing light exposure, or any combination thereof.

14. A method for monitoring operation of an integrated circuit, comprising the steps of:
    detecting a plurality of operating conditions of an integrated circuit;
    generating a detection signal if an abnormal operating condition is detected;
    storing the detection signal in nonvolatile memory;
    generating a reset signal;
    latching the detection signals from the step of generating feeding latched output signals to said nonvolatile memory;
    producing a program signal upon a latched output signal indicating an abnormal condition, feeding said program signal to said nonvolatile memory to cause said latched outputs to be stored therein and said program signal being used to start said step of generating a reset signal;
    resetting a CPU (central processing unit) in response to the reset signal after the detection signal has been stored in the nonvolatile memory; and automatically reading out the stored detection signal from the nonvolatile memory after resetting the CPU in response to a read signal generated by the CPU upon resetting of the CPU.

15. The method of claim 14, wherein the predetermined time is substantially equal to a time needed for storing the detection signal in response to the program signal.

16. The method of claim 14, wherein the step of detecting comprises detecting a frequency of a system clock, detecting a power supply voltage, detecting temperature, or detecting light exposure, or any combination thereof.

* * * * *